(12) United States Patent
Richins et al.

(10) Patent No.: US 8,069,148 B2
(45) Date of Patent: Nov. 29, 2011

(54) CONFIGURATION OF MULTIPLE DATABASE AUDITS

(75) Inventors: Jack S. Richins, Bothell, WA (US); Robert E. Walters, Northborough, MA (US); Sung Soo Kang, Redmond, WA (US); Ruslan P. Ovechkin, Redmond, WA (US); Sameer A. Tejani, Newcastle, WA (US); Craig Gick, Woodinville, WA (US); Raul Garcia, Kirkland, WA (US); Liying Jiang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 478 days.

(21) Appl. No.: 12/116,215

(22) Filed: May 7, 2008

(65) Prior Publication Data

US 2009/0282083 A1 Nov. 12, 2009

(51) Int. Cl.
*G06F 7/00* (2006.01)
(52) U.S. Cl. ...................................................... 707/648
(58) Field of Classification Search .................... 707/648
See application file for complete search history.

(56) References Cited

U.S. PATENT DOCUMENTS

| | | | |
|---|---|---|---|
| 5,561,795 A | 10/1996 | Sarkar | |
| 5,884,328 A | 3/1999 | Mosher, Jr. | |
| 6,324,548 B1 | 11/2001 | Sorenson | |
| 6,408,310 B1 | 6/2002 | Hart | |
| 6,584,477 B1 | 6/2003 | Mosher, Jr. | |
| 6,691,115 B2 | 2/2004 | Mosher, Jr. et al. | |
| 6,782,399 B2 | 8/2004 | Mosher, Jr. | |
| 2004/0177090 A1 | 9/2004 | Corbett-Clark | |
| 2005/0097149 A1* | 5/2005 | Vaitzblit et al. | 707/202 |
| 2005/0257267 A1* | 11/2005 | Williams et al. | 726/25 |
| 2007/0276834 A1 | 11/2007 | Chase | |

OTHER PUBLICATIONS

"DB Audit 4.0", http://www.softtreetech.com/dbaudit/index.htm.
Lumigent, "Audit DB for Sybase", Lumigent Technologies, Inc., Acton, MA 01720 USA, Copyright 2005, 2 Pages, available at :-http://www.solutiondata.co.uk/files/lumigent/Audit%20DB%20for%20Sybase.pdf.
Lumigent, "Entegra Database Auditing for Risk Management", available at :-http://www.edgewoodsolutions.com/tools/Lumigent/lumigentdatasheet.pdf.

* cited by examiner

*Primary Examiner* — Fazlul Quader

(57) ABSTRACT

Various technologies and techniques are disclosed for improving configuration of database audits. Multiple audits can be created for a database. Any one of the audits can be turned off without impacting an operation of any remaining audits. Database audits can be ported from one database server instance to another. Database audit metadata is stored in a database separately from a database server instance to which the database is attached. The database can be detached from the database server instance and attached to a second database server instance, with the database audit metadata moving along with the database automatically. Any audits associated with the database audit metadata are automatically activated for the second database server instance. Database audits can be configured using a hierarchical model.

15 Claims, 10 Drawing Sheets

| AUDIT CONFIGURATION | ACTION | AUDITED |
|---|---|---|
| AUDIT INSERT ON SCHEMA 1.T1 BY USER1 | INSERT ON SCHEMA 1.T2 BY USER1 | NO |
| AUDIT INSERT ON SCHEMA 1.T1 BY USER1 | INSERT ON SCHEMA 1.T1 BY USER2 | NO |
| AUDIT INSERT ON SCHEMA 1.T1 BY USER 1 | SELECT ON SCHEMA 1.T1 BY USER1 | NO |
| AUDIT INSERT ON SCHEMA 1.T1 BY USER 1 | INSERT ON SCHEMA 1.T1 BY USER1 | YES |
| AUDIT INSERT ON SCHEMA::SCHEMA 1 BY USER1 | INSERT ON SCHEMA 1.T1 BY USER1 | YES |
| AUDIT INSERT ON SCHEMA::SCHEMA 1 BY USER1 | INSERT ON SCHEMA 1.V1 BY USER1 | YES |
| AUDIT INSERT ON SCHEMA::SCHEMA 1 BY USER1 | INSERT ON USER 2.T2 BY USER 1 | NO |
| AUDIT INSERT ON SCHEMA::SCHEMA 1 BY USER1 | EXECUTE ON SCHEMA 1.SP1 BY USER1 | NO |
| AUDIT INSERT ON DATABASE::ADVENTUREWORKS BY USER1 | INSERT ON SCHEMA 1.T1 BY USER1 | YES |
| AUDIT INSERT ON DATABASE::ADVENTUREWORKS BY USER1 | INSERT ON SCHEMA 1.V1 BY USER1 | YES |
| AUDIT INSERT ON DATABASE::ADVENTUREWORKS BY USER1 | INSERT ON USER 2.T2 BY USER1 | YES |

FIG. 8

CONFIGURATION OF MULTIPLE DATABASE AUDITS

BACKGROUND

Database security is a serious issue that companies face. It is important that companies ensure that their database(s) is/are protected from unauthorized access since the majority the organization's sensitive information is contained within their database(s). Unauthorized access into the database could be catastrophic to a company. In fact, some companies have a legal obligation to ensure the privacy of their data through various data-privacy regulations in place that companies handling certain types of data must comply with. These regulations include best practice requirements and industry guidelines regarding the usage and access to customer data. Some of the privacy requirements include proper access control, separation of duties, and independent audit functions.

A feature called "database auditing" is often used to observe a database so as to be aware of the actions of database users. Database auditing is often utilized for security purposes, so that the company can ensure that information is not accessed by those without the permission to access it. With database audits, various details are recorded about what users do with the data in the database, such as what users modified certain data, what users viewed certain data, and so on. Database audits are typically applied to a database by the information technology department, and are usually assigned to the database as a whole.

One issue with current database systems has to do with segregation of audit data. With the increasing complexity of database audit requirements from different government and other agencies, it is often difficult to tell for what purpose a given audit requirement was added to the database to fulfill.

On a similar note, many audits may really only need to record a small subset of possible activities on the database server, such as access to a table containing sensitive data such as employee social security numbers. However, most audit systems today either only allow global configuration, i.e. audit all accesses to all tables, or they require programmers to encode what data accesses should be audited—making audit records either overly verbose or difficult to configure.

Another issue with database audits arises when databases need to be moved from one database server instance to another. There are existing techniques for moving databases from one server instance to another. However, with current audit systems, audit configuration metadata stays with the database server instance. This can make it a complex and error-prone operation to move databases that require audits from one server instance to another.

SUMMARY

Various technologies and techniques are disclosed for improving configuration of database audits. Multiple audits can be created for a database. Any one of the audits can be turned off without impacting an operation of any remaining audits.

In one implementation, a method for porting database audits from one database server instance to another is described. Database audit metadata is stored in a database separately from a database server instance to which the database is attached. The database can be detached from the database server instance and attached to a second database server instance, with the database audit metadata moving along with the database automatically. Any audits associated with the database audit metadata are automatically activated for the second database server instance.

In yet another implementation, a method for enabling database audits to be expressed using a hierarchical model is described. Database objects are organized into a hierarchy in a database. Database audits can be configured for one or more of the database objects at different levels in the hierarchy.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 8 is a diagrammatic view of an exemplary audit configuration for one implementation that affects whether actions are audited or not.

DETAILED DESCRIPTION

The technologies and techniques herein may be described in the general context as an application that improves the configuration of database audits, but the technologies and techniques also serve other purposes in addition to these. In one implementation, one or more of the techniques described herein can be implemented as features within a database program such as MICROSOFT® SQL Server, or from any other type of program or service that creates and/or manages database audits.

In one implementation, technologies and techniques are described for enabling multiple audits to be defined for a given database. These audits enable different business rules and/or compliance requirements to be isolated from one another, and to operate independently of one another. This isolation of audits is described in FIGS. 2-3. In another implementation, technologies and techniques are described for enabling audits to be ported from one database server instance to another automatically when the database itself is ported. This portability is described in further detail in FIGS. 3-6. In yet another implementation, technologies and techniques are described for utilizing an audit data definition language for defining database audit specifications. The syntax is described in further detail in FIGS. 7-9. Each will now be discussed in further detail in the figures that follow.

Figure 1:
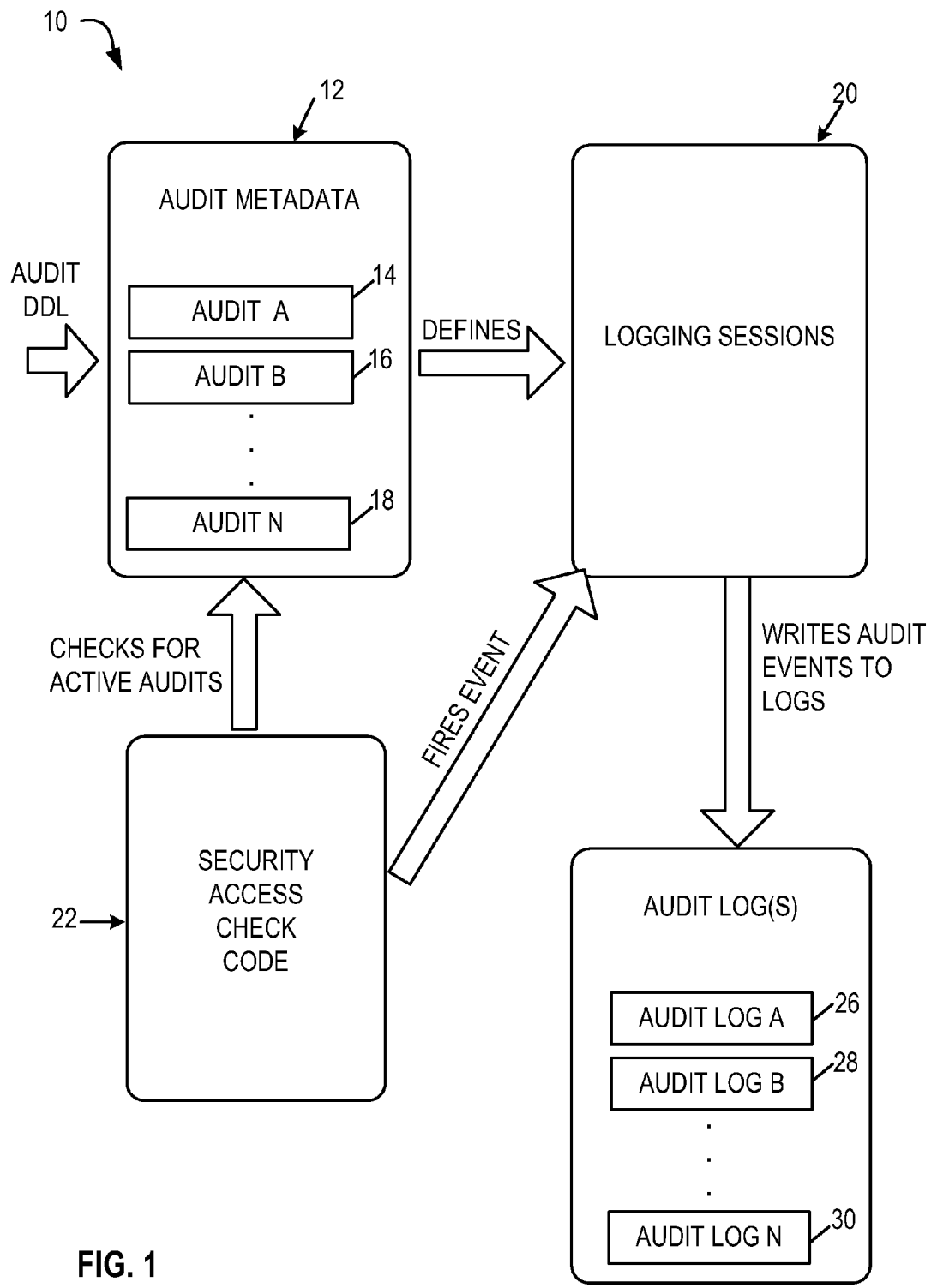
FIG. 1 is a diagrammatic view of a database audit system of one implementation.

FIG. 1 is a diagrammatic view of a database audit system 10 of one implementation. Audits (14, 16, and 18) define where and how events are recorded for actions on a database server instance. The term "audit" as used herein is meant to include an object or other entity that defines where and how events assigned to the audit are recorded for database objects within a specified database server instance. It will be appreciated that three audits are shown in FIG. 1 for the sake of illustration, but that any number of audits could be present in other implementations. Audits (14, 16, and 18) are each targeted for different compliance uses on the same database/server. An example of different compliance uses is described in further detail in FIG. 2. The database determines which events need to be recorded in which audit log (26, 28, or 30), which allows multiple audits to be exposed to database administrators. By assigning names and configuring each audit (14, 16, and 18) for a specific purpose, database administrators can better match the business requirements of real world audits with the audit configuration in the database server instance. Furthermore, any one of the audits (14, 16, and 18) can be turned on or off without impacting an operation of any remaining ones of the audits.

Audit data definition language (DDL) is used to record audit metadata 12. Logging sessions 20 are created by reading audit metadata 12 during server instance startup and database startup. In one implementation, one logging session 20 is started per each audit (14, 16, and 18) in metadata 12. In other implementations, a different number of logging sessions could be used. During access checks, which take place anytime a data object is acted upon, security access check code 22 will read audit metadata 12 to determine which audits (14, 16, and 18) are interested in the action being taken and then fires or records this event to the appropriate logging session 20. For example, suppose a certain table is about to be accessed to "read" and display the data to a user. If any one of the audits (14, 16, and 18) has declared their interest in auditing such accesses, then the action is fired or recorded to the appropriate logging session 20. The logging sessions 20 then record these events to their target audit logs (26, 28, and 30).

Figure 2:
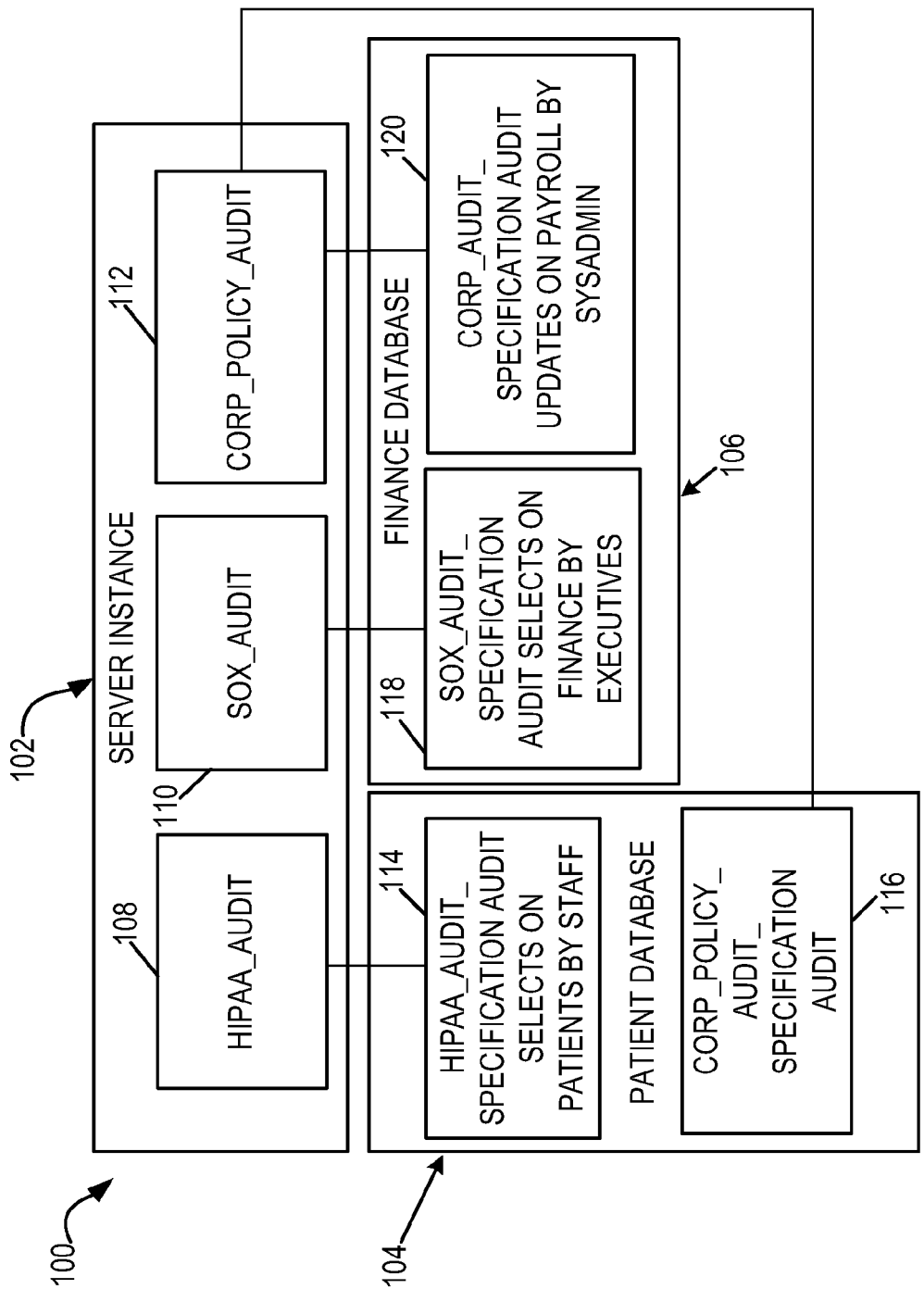
FIG. 2 is a diagrammatic view of an exemplary server instance having multiple audits and multiple databases.

FIG. 2 is a diagrammatic view 100 of an exemplary database server instance 102 having multiple audits (114, 116, 118, and 120) and multiple databases (104 and 106). The term "database server instance" as used herein is meant to include a database manager that is responsible for managing one or more databases. The term "database" as used herein is meant to include a collection of related data that are grouped together into one or more related files. In the hypothetical example shown, database server instance 102 has three audits defined. This is represented on FIG. 2 by the audit logs, namely: HIPAA_Audit 108, SOX_Audit 110, and Corp_Policy_Audit 112. These logs contain the logging information for the respective audits, while the corresponding audit specifications (described momentarily) contain the actions that need to be audited. Database server instance 102 also has two databases: a patient database 104 and a finance database 106. Patient database 104 has two audit specifications: one for HIPAA audits (HIPAA_Audit_Specification 114), and another for corporate policy audits (Corp_Policy_Audit_Specification 116). Finance database 106 has two audit specifications, which include SOX_Audit_Specification 118 and Corp_Audit_Specification 120.

By defining multiple audits with names, audits can be configured more logically, and independently of one another. For example, changes to what is audited in the Corp_Policy_Audit_Specification 116 can be made confidently without concern of affecting the audit configuration needed for the HIPAA_Audit_Specification 114 or SOX_Audit_Specification 118. This is achieved by having the security access check code (22 on FIG. 1) check not only whether an action on an object by a principal should be audited, but to which logging session the event should be fired or recorded.

Turning now to FIGS. 3-9, the stages for implementing one or more implementations of database audit system 10 are described in further detail. In some implementations, the processes of FIG. 3-9 are at least partially implemented in the operating logic of computing device 500 (of FIG. 10).

Figure 3:
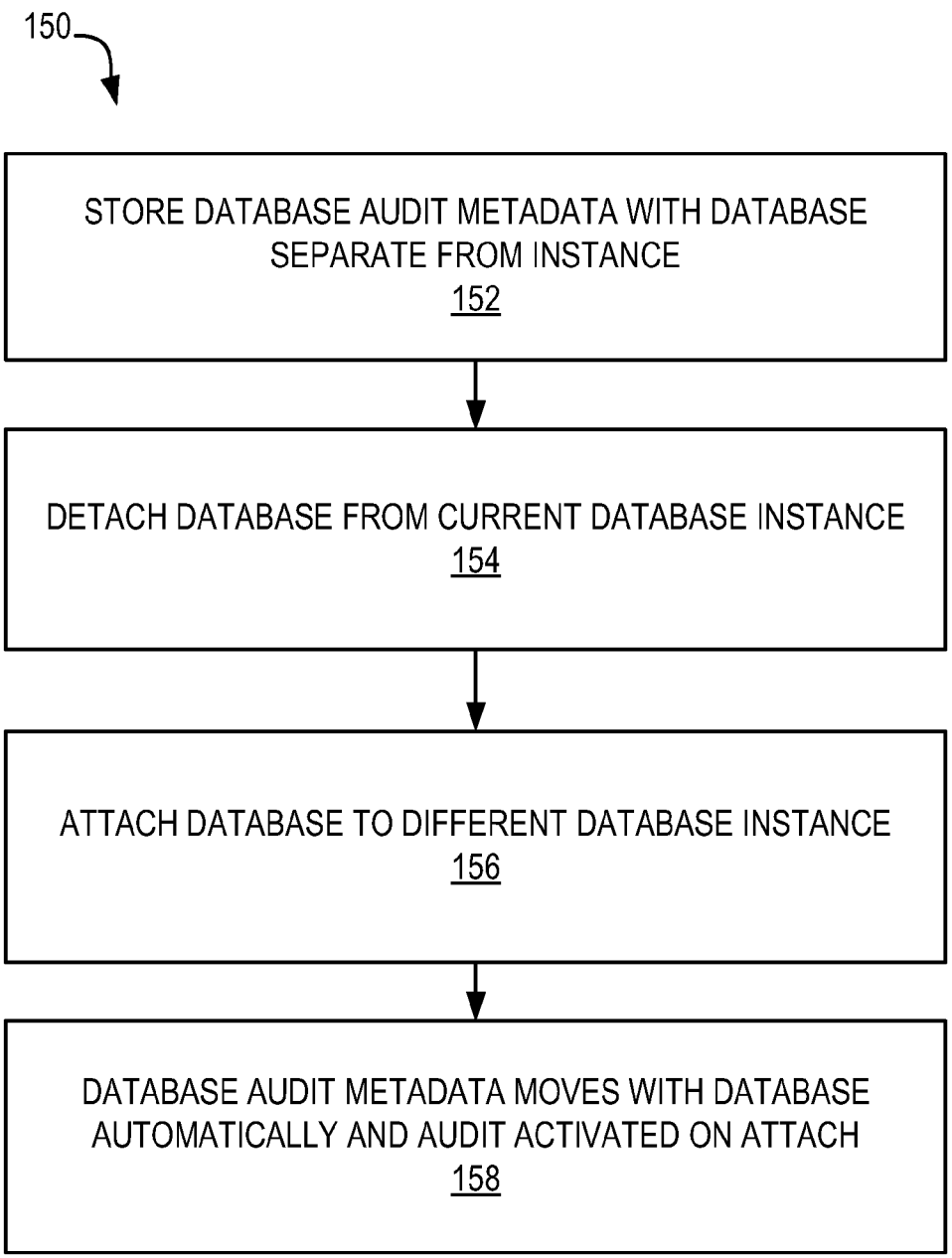
FIG. 3 is a process flow diagram for one implementation illustrating the stages involved in porting audit metadata from one database server instance to another.

FIG. 3 is a process flow diagram 150 for one implementation illustrating the stages involved in porting audit metadata from one database server instance to another. Database audit metadata is stored with the database separate from the database server instance (stage 152). The database audit metadata includes metadata for the audits that have been defined for the database. A few non-limiting examples of metadata include HIPAA_Audit_Specification 114, which describes that all selects on the schema object Patients by principals belonging to the Staff database role should be audited, and SOX_Audit_Specification 118 which describes that all selects on the schema object FINANCE by principals belonging to the EXECUTIVES database group. The database is detached from the current database server instance (stage 154). In one implementation, the detaching is performed upon receiving a selection of a detach option from a user. In other words, the user can select an option in the database management software to detach a selected database from its current database server instance.

The database is then attached to a different database server instance (stage 156). In one implementation, the attaching is performed upon receiving a selection of an attach option from a user. In such a situation, the user could select an option in the database management software to attach a selected database to a current database server instance. In another implementation, detaching and attaching is performed by simply changing one or more configuration settings to point the database to a different database server instance. The database audit metadata moves with the database automatically (stage 158). The audit is automatically activated when the database attaches to the new database server instance (stage 158). In one implementation, the activating is performed by an auditing subsystem of the database server instance that checks for the database audit metadata automatically upon database attach. In one implementation, the audit is automatically activated if the same audit as identified by a globally unique identifier is available on the new database instance at the server level. Otherwise, manual matching may need to be performed to match the audit specification to the new database server instance.

Figure 4:
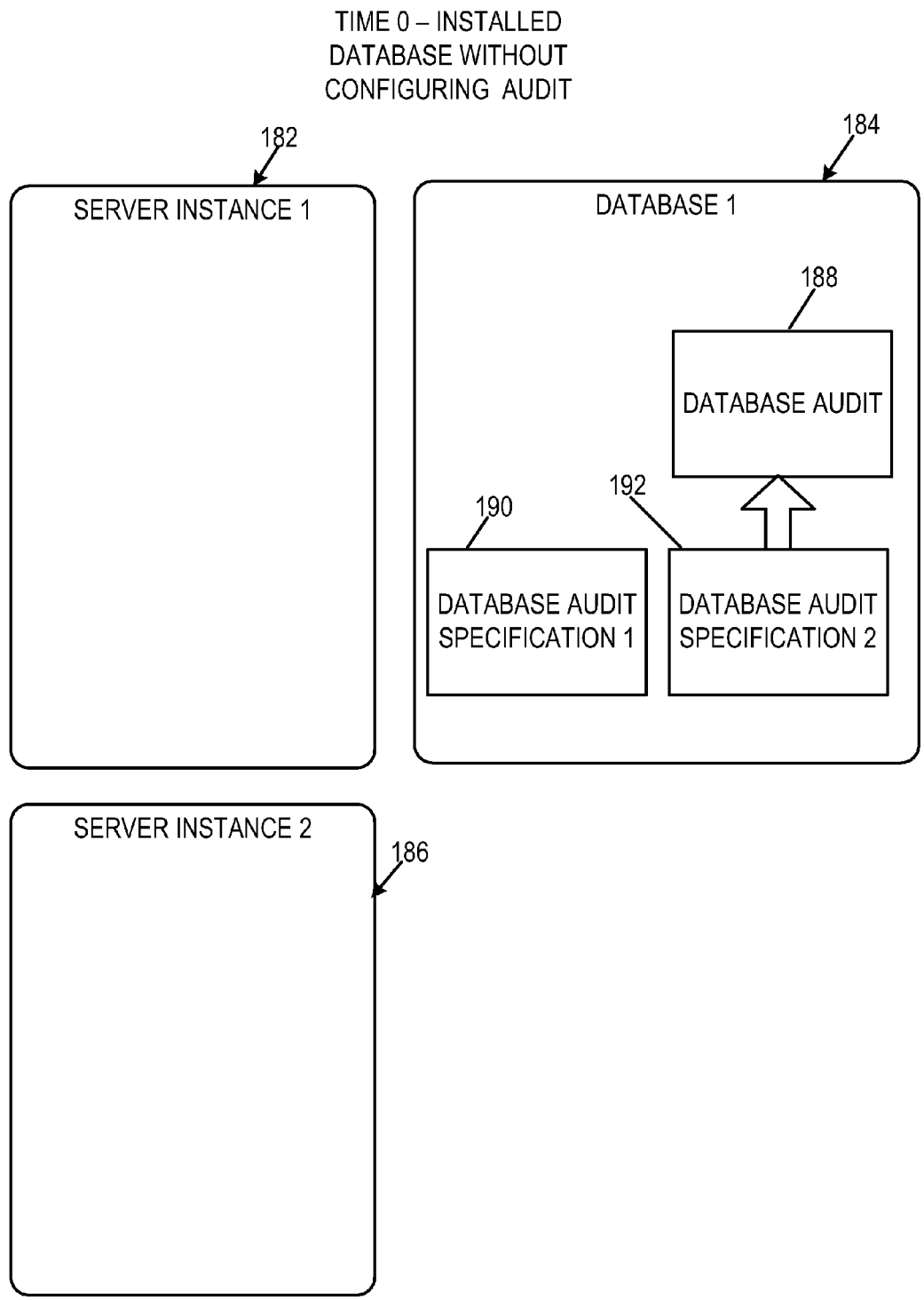
FIG. 4 is a diagrammatic view of a database audit system of one implementation at a point in time when a database has been installed but without yet having an audit configured.
Figure 5:
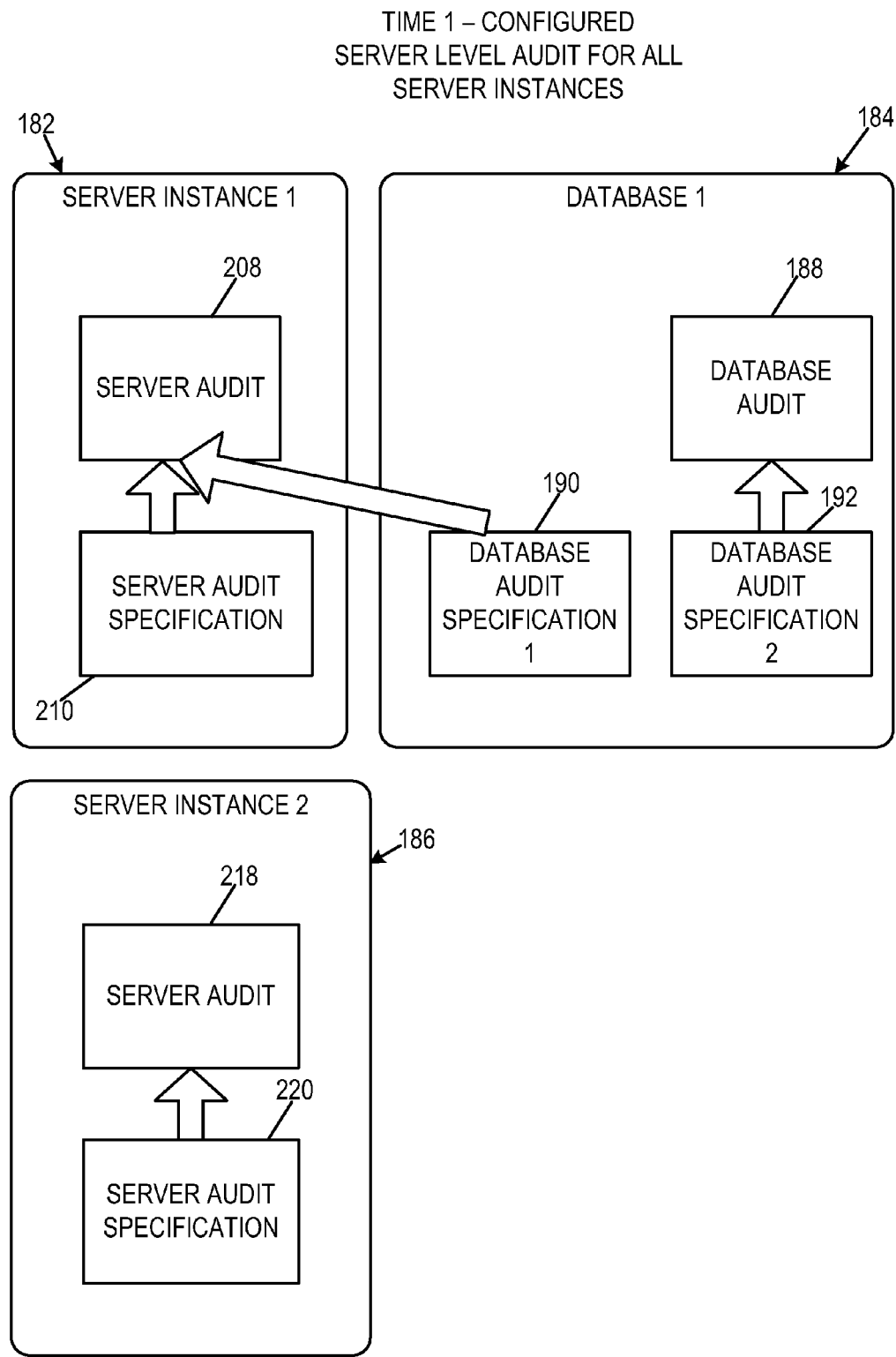
FIG. 5 is a diagrammatic view of a database audit system of one implementation at a point in time when a server level audit has been configured for a two server instances.
Figure 6:
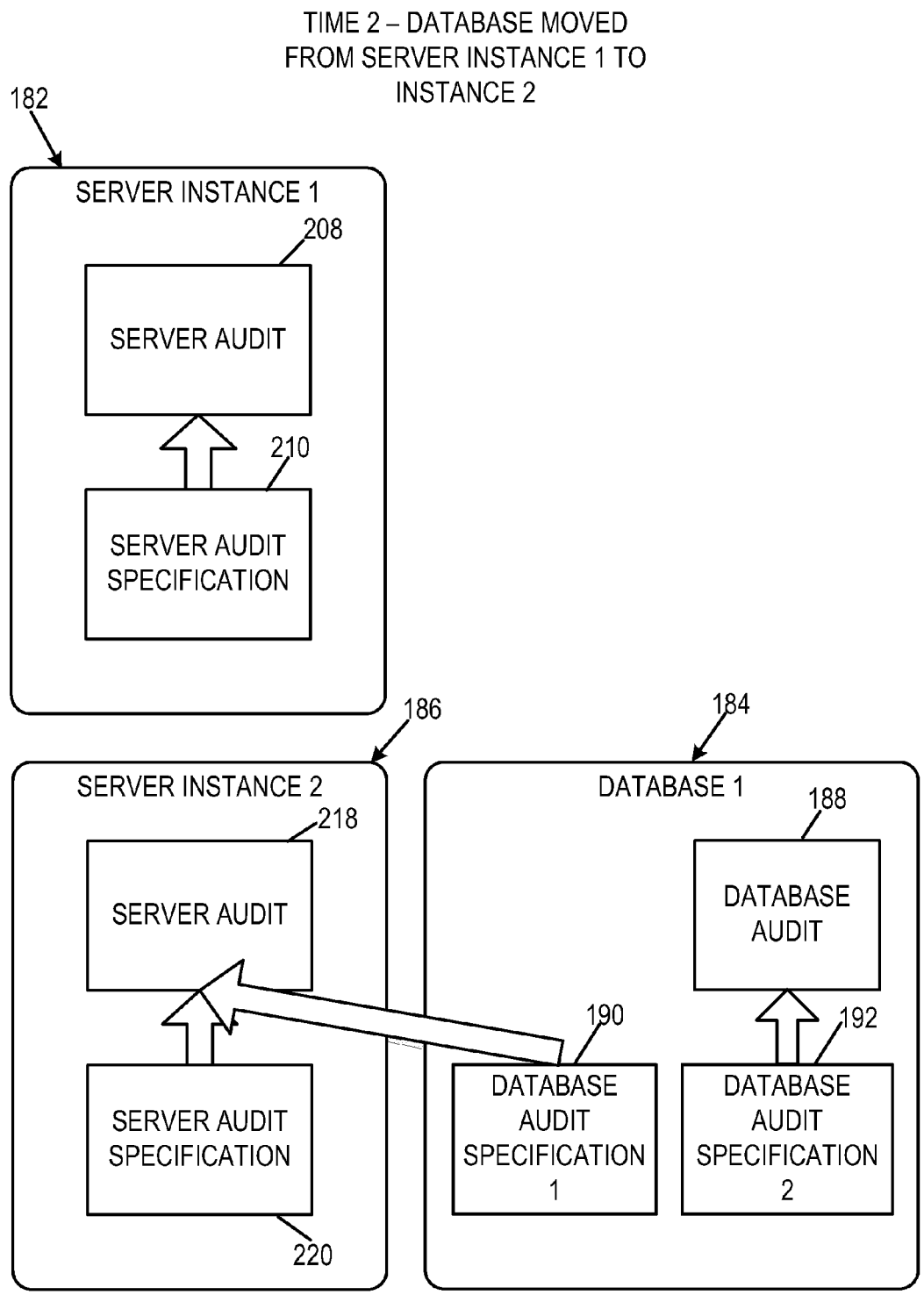
FIG. 6 is a diagrammatic view of a database audit system of one implementation as a point in time when a database has been moved from a first database server instance to a second database server instance.

Turning now to FIGS. 4-6, an example is shown for one implementation of how audits can be ported automatically with a database when the database is attached to a new database server instance. The same reference numbers will be used to refer to the same items in FIG. 4-6. Turning now to FIG. 4, a diagrammatic view is shown of a database audit system at a point in time when database 1 (184) has been installed but without yet having an audit configured. Server instance 1 (182) and server instance 2 (186) are not yet configured for any audits at this point in time. Database 1 (184) includes database audit (188), database audit specification 1 (190), and database audit specification 2 (192). As noted earlier, audits (in this example, database audit 188) define where and how events are recorded. Audit specifications (in this example, 190 and 192) define what events should be recorded and to which audit the event should be sent.

In one implementation, both audit objects and audit specification objects can exist in the database as well as in the database server instance(s). This is indicated on FIG. 5 which illustrates a server level audit being configured for both server instances (182 and 186). Server instance 1 (182) has a server audit 208 and a server audit specification 210. Server instance 2 (186) has a server audit 218 and server audit specification 220. By placing an audit in the database (188 on FIG. 5), this enables the entire definition of an audit to be moved when the database is moved, as described according to FIG. 3. In some implementations, there may be some limitations on where a database audit can record events, and thus in such scenarios, an audit at the server instance level could also be used to handle such limitations. However, audits at the server instance level could take more work to move a database with its audit(s) from one server instance to another. Thus, the examples shown in FIG. 4 illustrate having audits and audit specifications at both the database and the database server instance level. However, in other implementations, the audits and audit specifications can exist just at the database level, and such audits can be easily ported from one database server instance to another as was described in FIG. 3.

An audit specification at the server instance applies to events across the server instance—both server scope events and database scoped events. Thus, server audit specification 210 applies to events across the server instance 1 (182) and server audit specification 220 applies to events across the server instance 2 (186). An audit specification at the database level applies to only events in that database and may not specify server instance events such as login/logout or creation of a server endpoint. Thus, database audit specification 1 (190) and database audit specification 2 (192) apply only to events in database 1 (184).

The server audit (208 and 218) and database audit metadata objects (188) define a target log (operating system log, file, or potentially database table). The server audit specification (210 and 220) and database audit specifications (190 and 192) define which actions on data objects by what principals should be recorded in their respective scopes.

FIG. 6 then shows the effect of moving a database a first database server instance to a second database server instance. The database audit and database audit specification that are defined entirely at the database level can be easily ported to another database server instance according to the process described in FIG. 3. In the case of FIG. 6, database audit (188) and database audit specification 2 (192) are contained entirely at the database scope. Thus, when the database 1 (184) is detached from database server instance 1 (182) and attached to database server instance (186) as is represented by the arrows on FIG. 6, the audit (188) will continue to function. On database attach, the auditing subsystem of server instance 2 (186) will check for this audit metadata and begin auditing based on the audit metadata.

Figure 7:
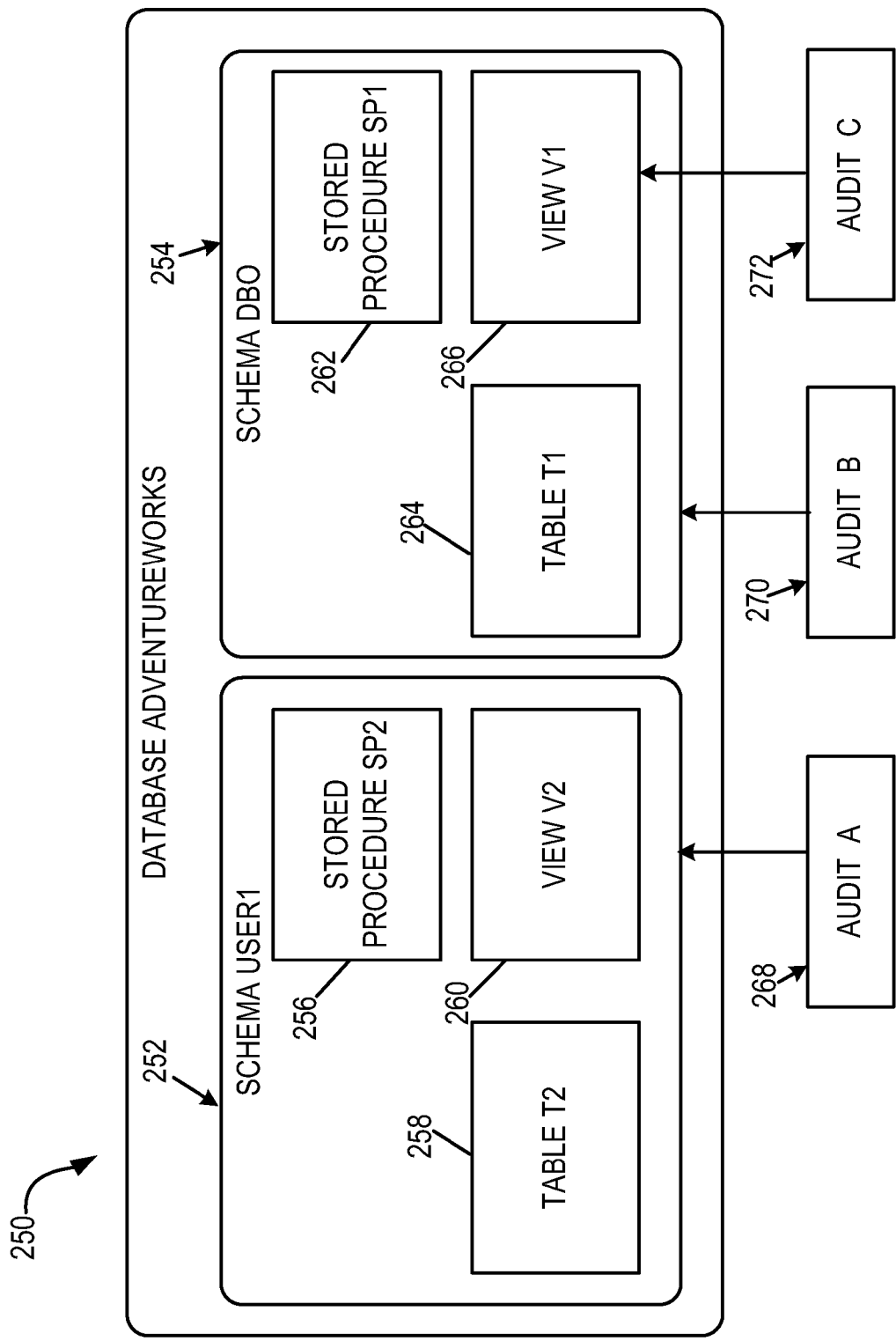
FIG. 7 is a diagrammatic view of an exemplary database that illustrates a database level, schema level, and object level in a database object hierarchy.
Figure 9:
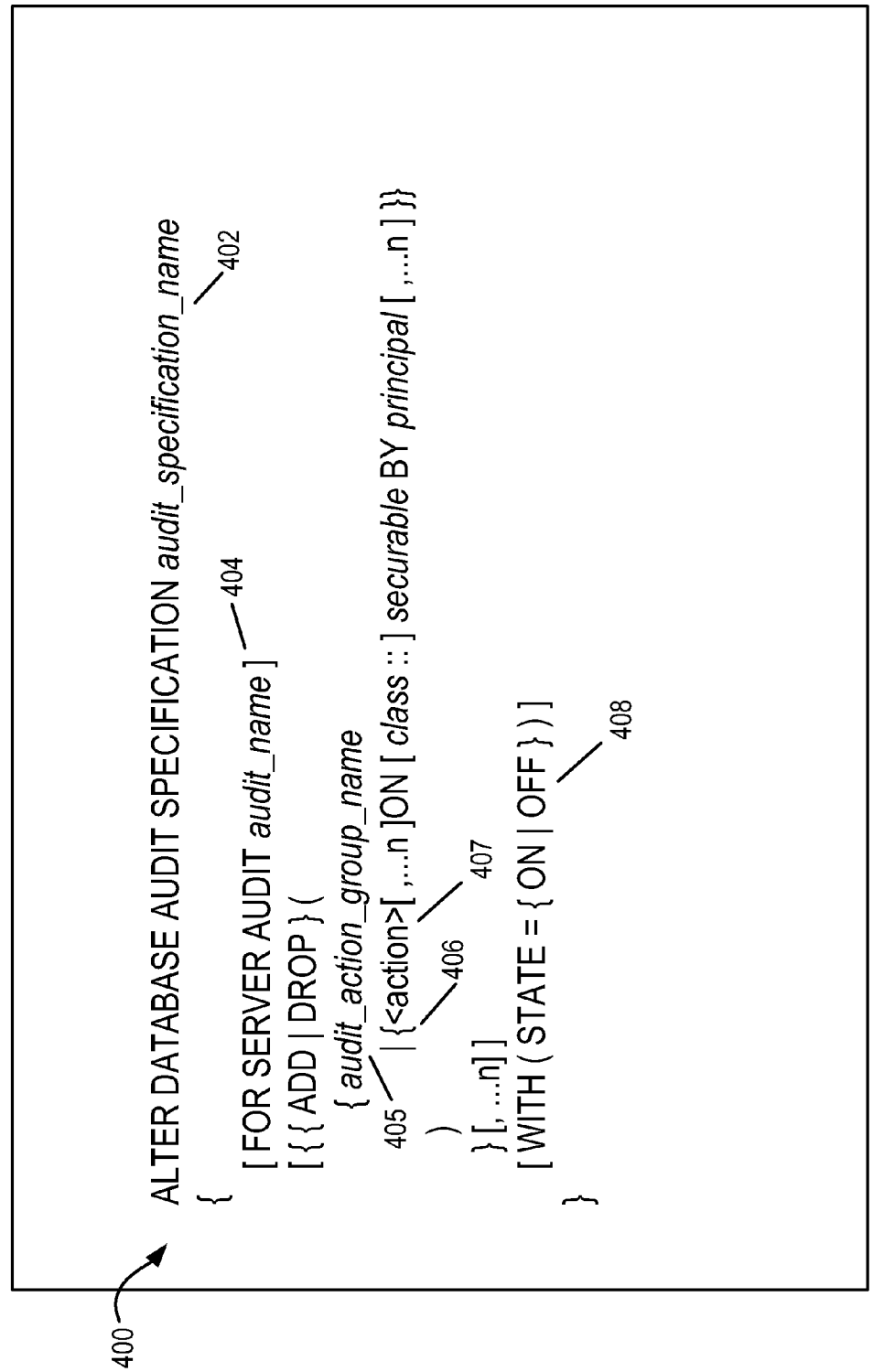
FIG. 9 illustrates some exemplary source code that defines an audit data definition language for defining a database audit specification.

Turning now to FIGS. 7-9, an audit data definition language and object model is described for defining audits. FIG. 7 is a diagrammatic view 250 of an exemplary database named "AdventureWorks" that illustrates a database level, schema level, and object level in a database object hierarchy. In one implementation, data objects in the database exist in a hierarchy of containment. All schema objects, such as tables, views, and stored procedures, are contained in a schema. All schemas are contained in a database. Auditable objects are organized into a hierarchy and configuration of auditable objects can be made at the different levels of the hierarchy. Schema objects, such as a table, are contained in a schema. Schemas are contained in a database. Audits may be defined on individual schema objects, on a schema such that all schema objects contained in that schema are audited, or on a database such that all schema objects in the database are audited.

Thus, in the example of FIG. 7, audit A (268) is defined at the schema level for schema user1 (252). This means that audit A (268) will apply to all of the objects contained in schema user1 (252), which include: stored procedure SP2 (256), table t2 (258), and view v2 (260). Similarly, audit B (270) is defined at the schema level for schema DBO (254). This means that audit B (270) will apply to all of those objects contained in schema DBO, which include stored procedure SP1 (262), table t1 (264), and view v1 (266). Audit C (272) is defined at the individual object level, and thus Audit C (272) will just apply to view v1 (266) to which it has been assigned. In other words, by providing a hierarchy for specifying audits, the audits can be applied more easily to entire groups of objects, while at the same time allowing the granularity when necessary so they are only performed when needed.

In one implementation, this audit data definition language for describing what to audit is patterned after a permission model already being used in a given database. By modeling the audit data definition language after the permission model syntax, end-user is able to apply a model they already understand (e.g. the permission model), to a new feature (e.g. auditing).

FIG. 8 is a diagrammatic view of an exemplary audit configuration 300 for one implementation that affects whether actions are audited or not. The diagram shows multiple audit configurations 302 and the actions 304 and audited indicators 306 that correspond to them. In other words, each entry in the table of the diagram show a type of configuration (such as a database insert onto a given object, such as table), and whether or not that action is audited or not. With audit configuration of actions on a schema object by a principal (such as User 1), there is either an exact match or there is not. If an audit configured on a schema, then that audit only applies to all objects in that schema. Objects outside the schema are not audited. Actions other than that specified are not audited. Actions by principals not specified are not audited. In one implementation, this hierarchy allows easy configuration from a very granular scope all the way up to broad sets of actions on all objects by all principals.

FIG. 9 illustrates some exemplary source code 400 that defines an example audit data definition language that can be used for defining a database audit specification. Audit data definition language includes an audit_specification_name 402, which is a field to identify the name of the specification. Audit 404 specifies an existing audit to which this specification being defined applies. The audit_action_group_name 405 defines a name of a group of auditable actions, such as SCHEMA_OBJECT_ACCESS_GROUP which will audit all access actions on all schema objects in the database. Audit action specification 406 (which is the entire line of code shown as 406) is a granular audit syntax. Instead of specifying an audit_action_group_name 405, a set of actions can be specified on a specific securable object by a set of principals, such as SELECT ON Table1 BY User1. Action 407 is the specific action to audit. In the case of a database, the set of actions 407 can include operations such as SELECT, INSERT, UPDATE, DELETE, REFERENCES, or EXECUTE. In one implementation, audit action specification 406 is available for database specifications only. State=ON|OFF 408 specifies that the audit actions defined within this audit specification should or should not generate audit records (i.e. be disabled). This may help administration in certain circumstances where you want to deploy the auditing configuration but not start the collection. As noted earlier, this audit data definition language for modeling audits can be modeled after existing permission models. The permission model of some databases consists of actions (select, insert, update, delete, etc.) on objects to principals. In one implementation, by leveraging the same hierarchy and similar syntax that administrators are familiar with for controlling permissions, auditing can be easier to administer.

The following are a few non-limiting examples of how the data definition language shown in FIG. 9 can be used. The first example illustrates a hypothetical usage of the data definition language to add a group of auditable actions (which is SCHEMA_OBJECT_ACCESS_GROUP in this example) to a particular audit specification (auditspec1 in this example):

ALTER DATABASE AUDIT SPECIFICATION auditspec1
ADD (SCHEMA_OBJECT_ACCESS_GROUP)

The next example illustrates a hypothetical usage of data definition language to add a more granular audit specification for a specific action by a specific user:

ALTER DATABASE AUDIT SPECIFICATION auditspec1
ADD (SELECT ON Table1 BY User1)

The next example illustrates turning a particular audit specification ON:

ALTER DATABASE AUDIT SPECIFICATION auditspec1 WITH (STATE=ON)

The next example illustrates a hypothetical usage of the data definition language to turn a particular audit specification OFF:

ALTER DATABASE AUDIT SPECIFICATION auditspec1 WITH (STATE=OFF)

Figure 10:
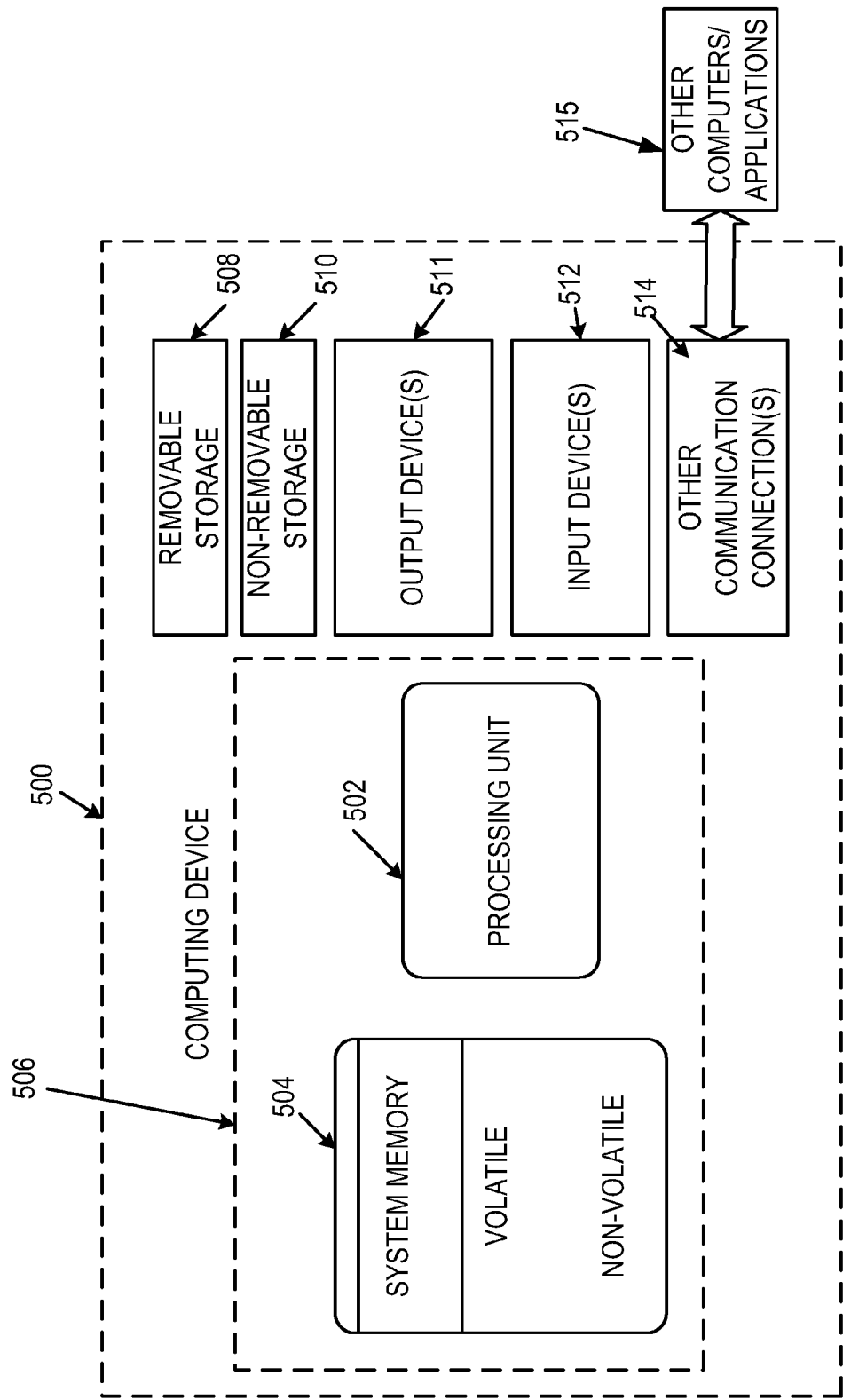
FIG. 10 is a diagrammatic view of a computer system of one implementation.

As shown in FIG. 10, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 10 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 10 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A computer-readable storage medium having computer-executable instructions for causing a computer to perform steps comprising:
    creating a plurality of audits for a database, the database including a collection of related data that are grouped together in one or more related files;
    configuring anyone of the audits to be turned off without impacting an operation of any remaining ones of the audits;
    storing data for the audits in a database separately from a database server instance to which the database is attached;
    moving the database to a different database server instance; and
    automatically activating the audits for the different database server instance in response to moving the database to the different database server instance.

2. The computer-readable storage medium of claim 1, wherein the audits are each based upon different business requirements.

3. The computer-readable storage medium of claim 2, wherein at least some of the business requirements are based upon compliance requirements.

4. The computer-readable storage medium of claim 1, wherein the audits are defined for database objects.

5. The computer-readable storage medium of claim 4, wherein the database objects are organized in a hierarchy.

6. The computer-readable storage medium of claim 5, wherein the hierarchy comprises at least three levels for categorizing the database objects, with a first level being a database level, with a second level being a schema level, and with a third level being an individual object level.

7. The computer-readable storage medium of claim 5, wherein the audits can be defined for the database objects at the different levels in the hierarchy.

8. A method for porting database audits from one database server instance to another comprising the steps of:
    storing database audit metadata in a database separately from a first database server instance to which the database is attached, the first database server instance including a database manager that is responsible for managing one or more databases;
    detaching the database from the first database server instance;
    attaching the database to a second database server instance, wherein the database audit metadata moves along with the database automatically;

activating any audits associated with the database audit metadata automatically for the second database server instance in response to attaching the database to the second database server instance; and configuring an audit associated with the database audit metadata to be turned off without impacting any remaining ones of the audits associated with the database audit metadata.

9. The method of claim 8, wherein the database audit metadata includes metadata for a plurality of audits that have been defined for the database.

10. The method of claim 8, wherein the detaching step is performed upon receiving a selection of a detach option.

11. The method of claim 8, wherein the attaching step is performed upon receiving a selection of an attach option.

12. The method of claim 8, wherein the detaching and attaching steps are performed by updating one or more configuration settings to point the database to the second database server instance.

13. The method of claim 8, wherein the activating step is performed by an auditing subsystem that checks for the database audit metadata automatically upon database attach.

14. A method for enabling database audits to be configured using a hierarchical model comprising the steps of:

organizing database objects into a hierarchy in a database, the hierarchy comprising at least three levels for categorizing the database objects, with a first level being a database level, a second level being a schema level, and a third level being an individual object level;

configuring database audits for the database objects at different levels in the hierarchy such that a first portion of the database audits is configured at the database level, a second portion of the database audits is configured at the schema level, and a third portion of the database audits is configured at the individual object level; and using an audit data definition language to specify what database objects to audit.

15. The method of claim 14, wherein the audit data definition language follows a same syntactical structure as a permission model syntax that is used for specifying security permissions for the database objects in the database.

* * * * *